(12) United States Patent
Frost et al.

(10) Patent No.: US 12,341,344 B2
(45) Date of Patent: Jun. 24, 2025

(54) METHOD AND APPARATUS FOR SYNCHRONISATION AND DATA TRANSMISSION

(71) Applicant: Oxford University Innovation Limited, Oxford (GB)

(72) Inventors: Damien Frost, Oxford (GB); Tim Frost, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 561 days.

(21) Appl. No.: 17/636,146

(22) PCT Filed: Aug. 20, 2020

(86) PCT No.: PCT/GB2020/052005
§ 371 (c)(1),
(2) Date: Feb. 17, 2022

(87) PCT Pub. No.: WO2021/032989
PCT Pub. Date: Feb. 25, 2021

(65) Prior Publication Data
US 2022/0337146 A1 Oct. 20, 2022

(30) Foreign Application Priority Data
Aug. 21, 2019 (GB) ..................... 1912026

(51) Int. Cl.
*H04B 3/00* (2006.01)
*H02J 3/36* (2006.01)
(Continued)

(52) U.S. Cl.
CPC ............. *H02J 3/36* (2013.01); *H02M 1/0067* (2021.05); *H02M 3/158* (2013.01); *H02M 7/4835* (2021.05); *H04J 3/0658* (2013.01)

(58) Field of Classification Search
CPC ...... H02J 3/36; H02M 7/4835; H02M 1/0067; H02M 3/158; H04J 3/0658; H04J 3/0661; G06F 15/7814
(Continued)

(56) References Cited

U.S. PATENT DOCUMENTS

2007/0061524 A1* 3/2007 Thomsen ............ G06F 15/7814
711/154
2015/0229234 A1 8/2015 Park et al.
(Continued)

FOREIGN PATENT DOCUMENTS

CN 1684405 A 10/2005
CN 101473374 A 7/2009
(Continued)

OTHER PUBLICATIONS

International Search Report and Written Opinion for WO 2021/032989 (PCT/GB2020/052005), dated Oct. 21, 2020, pp. 1-13.
(Continued)

*Primary Examiner* — Phuong Phu
(74) *Attorney, Agent, or Firm* — Thomas|Horstemeyer, LLP (57) ABSTRACT

An electronics circuit, comprising: a master controller; and a plurality of modules; wherein the master controller comprises: a timing signal generator arranged to generate a timing signal; and a data signal generator arranged to generate a data signal; wherein the master controller is arranged to generate a combined signal based on both the timing signal and the data signal; and wherein the master controller is arranged to broadcast the combined signal to the plurality of modules. By broadcasting the timing signal to the modules along with the data signal, the available bandwidth is effectively utilised without requiring a large number of separate signal paths to each module and without
(Continued)

time multiplexing the signals. Thus accurate time synchronisation can be achieved such that the system can operate effectively at a high switching frequency. As the switches on the modules are not directly controlled by the master controller, the system provides a decentralised architecture in which processing of the received signals can be done locally on each module.

26 Claims, 5 Drawing Sheets

(51) Int. Cl.
*H02M 1/00* (2006.01)
*H02M 3/158* (2006.01)
*H02M 7/483* (2007.01)
*H04J 3/06* (2006.01)
*H04L 25/00* (2006.01)

(58) Field of Classification Search
USPC ....... 375/257, 258, 219, 220, 222, 282, 261, 375/238
See application file for complete search history.

(56) References Cited

U.S. PATENT DOCUMENTS

| | | |
|---|---|---|
| 2017/0195148 A1 | 7/2017 | Payne |
| 2018/0152282 A1 | 5/2018 | Choi et al. |
| 2018/0196465 A1* | 7/2018 | Sharpe-Geisler ..... H04J 3/0661 |
| 2019/0028038 A1 | 1/2019 | Alvarez Valenzuela et al. |
| 2020/0036504 A1 | 1/2020 | Fukumoto |

FOREIGN PATENT DOCUMENTS

| | | |
|---|---|---|
| CN | 105281752 A | 1/2016 |
| CN | 106370210 A | 2/2017 |
| CN | 107 834 867 A | 3/2018 |
| CN | 108228514 A | 6/2018 |
| CN | 109643298 A | 4/2019 |
| GB | 9504790 A | 9/1995 |
| WO | 2011044933 A1 | 4/2011 |
| WO | 2017033069 A1 | 3/2017 |
| WO | 2018/173623 A1 | 9/2018 |

OTHER PUBLICATIONS

UK Search Report for GB 1912026.0, dated Feb. 11, 2020, pp. 1-4.
Chinese Office Action for Application No. 202080059146.7, mailed Apr. 21, 2025, 22 pages (Translation Included).

\* cited by examiner

METHOD AND APPARATUS FOR SYNCHRONISATION AND DATA TRANSMISSION

CROSS-REFERENCE TO RELATED APPLICATIONS

This application is the National Stage of International Application No. PCT/GB2020/052005, filed Aug. 20, 2020, which claims priority to GB 1912106.0, filed Aug. 21, 2019, which are entirely incorporated herein by reference.

This invention relates to electronics circuits, e.g. in power electronics, in particular to control of sub-systems within a power electronics circuit, such as transmission of timing and control signals within power converters.

Power electronics circuits may be considered to be switching circuits that control the flow of electrical energy. Examples of power electronics devices are switched mode power supplies, power converters and power inverters, e.g. for motor drives. Power electronics are important in today's energy distribution and management systems. More than 80% of the electrical power generated today is processed by power electronics systems.

Where power electronics devices have a large number of switches, the control of those switches can become burdensome. For example, keeping a large number of switches in synchronisation with each other requires a lot of architecture, e.g. a separate wire or PCB trace to each switch.

Figure 1:
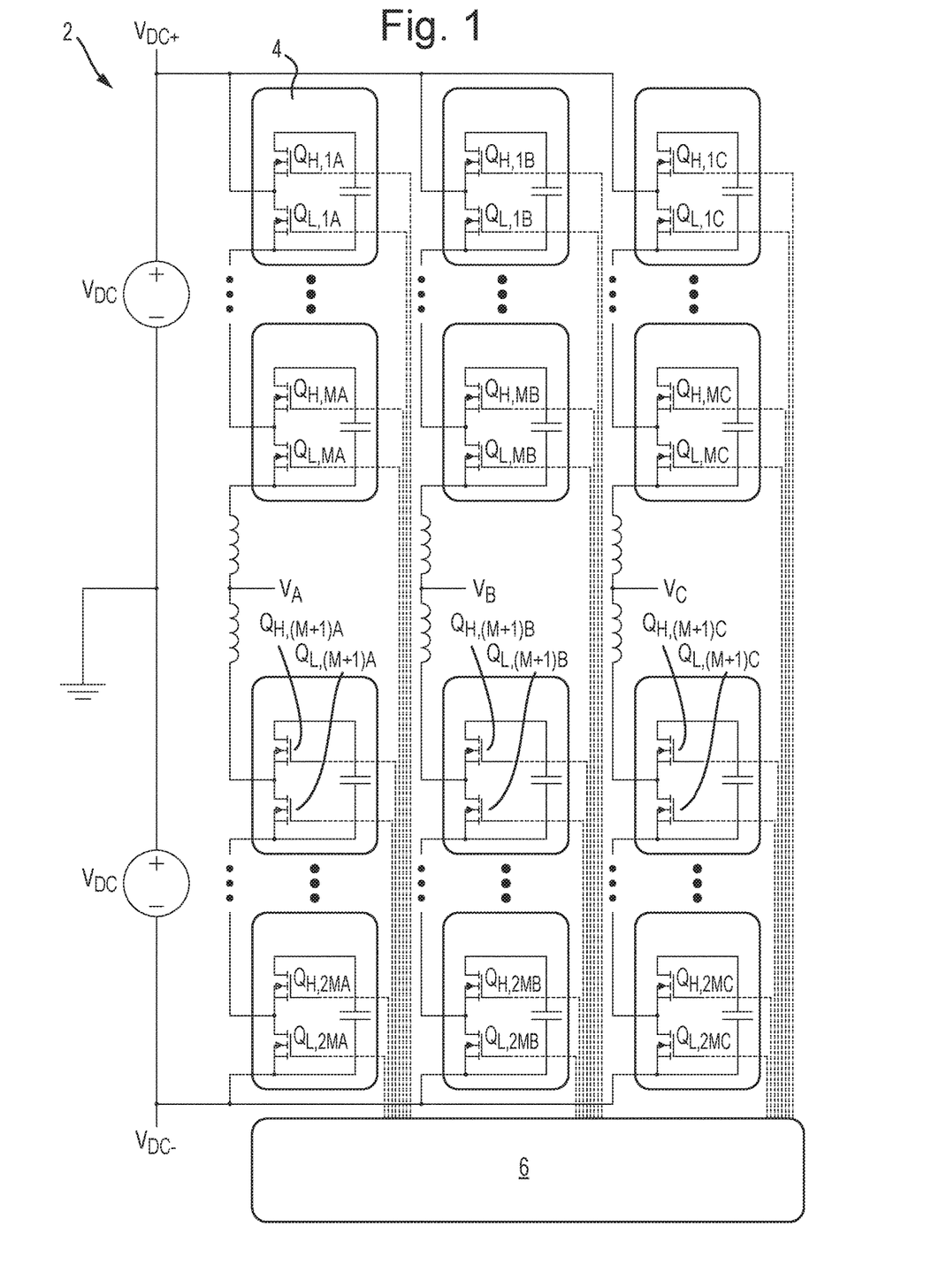
FIG. 1 shows a modular multilevel converter (MMC) as is known in the art.

An example of an existing modular multilevel converter (MMC) 2 is shown in FIG. 1. MMCs provide many benefits from an energy conversion point of view, but they introduce many complexities. For example, the half-bridge MMC inverter topology shown in FIG. 1 has 2M modules 4 per leg (and it is a three-phase MMC and thus has three legs as indicated by the labels A, B, C). Each of these modules 4 has a half-bridge switching circuit comprising two switches. All the switches in the whole MMC 2 need to be controlled in synchronisation and thus, each needs a control signal from the master microcontroller 6. Therefore the MMC 2 has 3×2M×2=12M switches and correspondingly has 12M separate signal paths (e.g. wires or traces) delivering those switching signals from the microcontroller 6 (the signal paths being shown in dashed lines). In addition, each module 4 typically has certain sensors such as a voltage sensor, a current sensor and/or a temperature sensor and transmits the data from these sensors back to the master microcontroller each signal being transmitted along another signal path, not shown in FIG. 1. It is important in such a device that all of the switching actions of all of the MOSFETs in FIG. 1 are synchronised in order to achieve proper voltage and current regulation at the inputs and outputs of the converter. The number of signal paths required provides a scalability problem. Therefore with larger numbers of modules, some multiplexing must be used in order to reduce the total number of signal paths and connections to the microcontroller. However, multiplexing is not always possible. While MMCs are typically operated at a relatively low frequency (e.g. at 50 Hz or 60 Hz), and can thus tolerate small variations in the timing signals that are sent along the multiple signal paths (e.g. as introduced by multiplexing), such an architecture begins to fail at higher frequencies as the control signals are not sufficiently synchronised.

According to a first aspect of the invention, there is provided an electronics circuit, comprising:
a master controller; and
a plurality of modules;
wherein the master controller comprises:
a timing signal generator arranged to generate a timing signal; and
a data signal generator arranged to generate a data signal;
wherein the master controller is arranged to generate a combined signal based on both the timing signal and the data signal; and
wherein the master controller is arranged to broadcast the combined signal to the plurality of modules.

According to another aspect of the invention, there is provided an electronics circuit, comprising:
a master controller; and
a plurality of modules;
wherein the master controller comprises:
a timing signal generator arranged to generate a timing signal; and
a data signal generator arranged to generate a data signal;
wherein the master controller is arranged to modulate the data signal onto the timing signal to generate a combined signal; and
wherein the master controller is arranged to broadcast the combined signal to the plurality of modules.

By broadcasting the timing signal to the modules along with the data signal, the available bandwidth is effectively utilised without requiring a large number of separate signal paths to each module (or indeed each switch) and without time multiplexing the signals. Thus accurate time synchronisation can be achieved between the master controller and the modules (and thus between all of the modules) such that the system can operate effectively at a high switching frequency, while remaining well synchronised. As the switches on the modules are not directly controlled by the master controller, the system provides a decentralised architecture in which processing of the received signals can be done locally on each module. For example, each module can have its own microcontroller which is arranged to process the received data and control individual components of the module (e.g. power electronics switches) while ensuring that it does so in synchrony with the received timing signal and thus in synchrony with all other modules. This decentralised architecture reduces the processing load of any single microcontroller (e.g. as compared to the existing design depicted in FIG. 1 where a single microcontroller in the master controller controls everything). Further, each microcontroller can have its own local clock with synchronisation of switching being achieved via the common timing signal.

The term synchronisation, referred to herein, simply means that the modules all share a common timing signal, so that they all maintain a precise or well-defined time relationship, relative to one another. For the modules to be considered as synchronised it is not required that they operate in unison, or actually carry out the same actions at the same times, but only that the actions which each module carries out occur with a well-defined time relationship to the actions of the other modules.

Optionally, the circuit is a power electronics circuit.

In some examples, the master controller is arranged to modulate the data signal onto the timing signal to generate the combined signal. This advantageously provides a simple method of producing a combined data and timing signal, using simple "off-the-shelf" components.

Alternatively, the timing signal may be a precisely-timed trigger signal, wherein the timing signal generator may be configured to send the precisely-timed trigger signal to the data signal generator, and wherein the data signal generator may be arranged to transmit data at a precise time, based on the precisely-timed trigger signal. This advantageously allows the precise timing at which the signals are transmitted to be extracted from the transmitted signals, and thereby provides a sufficiently accurate timing signal for modules to use the signal for synchronisation. In other words, the data signal is sent at a precise time such that the start of the data (or the end of the data) can be taken as a timing signal.

In some embodiments the precisely-timed trigger signal and the data signal may be generated by the same unit. For example a precision data generator such as a precision UART module could generate its own precise timing signal and send its data signal at the precise times defined by the timing signal.

It may be that not all modules need the data that is transmitted along with the timing signal, but in preferred examples each of the plurality of modules is arranged to extract the data signal from the combined signal. The data signal may contain information that is common to all modules and/or it may contain data that is specific to individual modules and which the relevant individual modules can extract by suitable processing.

It will be appreciated that the data in the data signal can be independent from the data in the timing signal. In other words the data signal and the timing signal can each be an independent data stream. Thus, although the two data streams are combined and transmitted together, they are used for independent purposes. The timing signal is used for time synchronisation of the modules while the data signal contains digital data to be processed and used by the modules.

The data signal is preferably a serial digital data signal. The serialisation of the data allows it to be modulated readily onto the timing signal or sent based on the timing signal. The digital nature of the data allows it to be processed by binary logic gates which are fast and efficient. Data that needs to be transmitted can be turned into a serial data stream by any suitable means. However, one particularly suitable mechanism is a Universal Asynchronous Receiver Transmitter (UART) module. UART modules are common and often included in standard microcontrollers, which makes them particularly suitable.

In some examples, the timing signal is a square wave. In this document "square wave" means any rectangular pulsed wave with sharp transitions between phases and is not limited to the two phases ("on" and "off" phases) being equal in length. Again, this makes it particularly suitable for processing. The sharp edges of a square wave are ideal for timing purposes as edge detection circuits can then be used to extract the timing information from the signal in a fast and efficient manner, allowing easy synchronisation with minimal processing.

In the case of the master controller being arranged to modulate the data signal onto the timing signal to generate the combined signal, the master controller may be arranged to modulate the data signal onto one phase of the timing signal (i.e. either the on phase or the off phase). In general, modulating the data signal onto the timing signal partially obscures the information in the timing signal as the combined signal is then no longer a pure square wave. In order for the data part of the combined signal to be readily demodulated, it needs to have enough amplitude for easy level detection. While it may be possible to have different amplitudes for the data part and the timing part, this introduces further complexities for the demodulation scheme. In particular, in the case of certain circuits such as MMCs or DC-DC converters where a number of modules may be connected in series such that they do not have a common ground reference (i.e. a common ground potential), the signal that is received by the module is preferably passed through a digital isolator in order to make it easy to analyse by the module's processor. In order to avoid complexity, it is therefore preferred that the data signal and the timing signal have substantially the same amplitude. Accordingly, the data signal will to a certain degree degrade the shape of the square wave that is generated by the master controller for use as the timing signal. However, where the data signal is modulated only onto one phase of the timing signal, i.e. only onto the "low" phase or only onto the "high" phase of the timing signal, the other phase is still distinct and clearly shaped and thus provides clear information that could be used to extract the timing information at the other end (i.e. in the modules).

The master controller is preferably arranged to modulate the data signal onto the phase of the timing signal, with a minimum delay, $T_{delay}$, (see FIG. 4a), following the start of the phase. This delay also separates the data transmission by a defined amount from the edge that defines the phase of the timing signal onto which the data is modulated. This ensures that the timing edge of the timing signal that begins that phase is still available to provide timing information to the modules. This delay is preferably long enough so that the receiving modules may clearly discern the first edge of the timing signal from the first edge of the data signal. In some examples, the delay can be a minimum of 1.5 bits long so as to clearly separate the timing edge from the start of the data. In some systems, it is not possible to know exactly when the data signal will be sent. However, as long as the delay, $T_{delay}$, plus the time required to send the data signal, $T_{data}$, are less than the duty cycle of the timing signal, $DT_s$, then the modules will receive the data successfully and be properly synchronised with the master.

Any form of modulation may be used to combine the data signal with the timing signal. However, in preferred embodiments the master controller is arranged to modulate the data signal onto the timing signal by performing a logical AND operation on the data signal and the timing signal. The use of a logical AND operation is especially straightforward and can be implemented inexpensively, while requiring very little (or no) processing power. The use of a binary AND operation, i.e. operating only on high and low signals (i.e. '0' and '1'), means that the data signal and the timing signal must be the same amplitude as discussed above, but the advantages of simplicity are apparent. In particular, while the AND operation may be implemented in software, e.g. as part of a microprocessor, in preferred examples a hardware AND gate is configured to perform the logical AND operation. The hardware gate requires no processing overhead at all and can simply combine the two input signals in real time as they are generated. In such cases, the data signal generator (e.g. including a UART module) and the timing generator (e.g. including a pulse width modulator (PWM) module) may be implemented on a common microprocessor with the output signals (data signal and timing signal) being output on pins of the microprocessor. The AND gate may then be a separate hardware component taking inputs from the two microprocessor output pins and providing its output directly to the modules (e.g. via wires or PCB traces). It will be appreciated that for the logical AND operation to be effective, the data signal must be high when not transmitting data. This is the case for a UART module. In other examples, alternative logic could be used to combine a timing signal with a data signal that is normally low when not transmitting (e.g. using an XOR gate and a NOT gate).

As the switches in the modules are no longer controlled directly by the master controller, they are instead controlled based on a locally generated clock in each module. The synchronisation across modules may be achieved by generating a clock in each module, but regularly resetting that clock based on the timing signal broadcast by the master controller. Thus, in preferred embodiments, each of the plurality of modules is arranged to reset a local clock of the module based on the received combined signal.

Each of the plurality of modules may comprise a PWM module arranged to generate a PWM output having a frequency and a duty cycle, and arranged to reset its PWM output based on a reset signal, wherein the received combined signal from the master controller is combined with the PWM output of the PWM module to generate the reset signal. A PWM cycle consists of two phases, an "on" phase and an "off" phase. The duty cycle is the ratio of the "on" phase, relative to the whole period of the cycle. The frequency is the number of full PWM cycles per second. This arrangement provides a feedback loop whereby the PWM module's output affects its own reset signal. The advantage of this arrangement is in avoiding problems that might otherwise occur with the data portion of the combined signal.

The combined signal itself cannot be used alone to reset the PWM module as the data portions embedded within (e.g. modulated on) the signal would generate random and unpredictable resets of the PWM signal, preventing the desired synchronisation from being achieved. Instead, with the feedback arrangement, an edge of the timing signal triggers a reset of the PWM module which thus starts to produce a square wave output similar to that of the timing signal. In some examples, the PWM resets upon receiving a rising edge. In other examples, the PWM resets upon receiving a falling edge. When this synchronised signal is then fed back into the PWM's reset input, it overrides any resets that might be triggered by changes of state in the data part of the combined signal, thus ensuring that the PWM module does not reset while the data portion of the combined signal is incoming. Optionally the received combined signal from the master controller is combined with the PWM output of the PWM module using a first logical OR operation. The logical OR operation is ideal for allowing the PWM output to override any changes of state in the combined signal. Alternatively the received combined signal from the master controller is combined with the PWM output of the PWM module using a logical AND operation. Optionally a hardware AND gate is configured to perform this logical AND operation.

In some examples, once the PWM output has been reset, it outputs a '1' (or 'high') signal for the duration of its duty cycle (as defined by its frequency input and its duty cycle input). In some examples the frequency input and duty cycle input of the PWM module match the frequency input and duty cycle of the master controller). Therefore for the duration of the PWM module's duty cycle, the PWM module's reset input remains high. In such examples, this input resets on a rising edge, and thus the PWM module is prevented from further resets until its duty cycle has elapsed. It will be appreciated that in this arrangement, the duty cycle of the PWM module must be long enough that it outlasts the length of the modulated data part of the combined signal so as to ensure that the data part cannot reset the PWM module and therefore cannot cause unwanted changes to the locally generated clock (i.e. the output of the PWM module).

As discussed above, the OR gate may be implemented in software, but preferably a hardware OR gate is configured to perform the first logical OR operation. The hardware OR gate is fast and inexpensive as well as being simple. As above, the other functions of the module such as the PWM module and a data decoder such as a UART module may be implemented on a standard microcontroller, while the OR gate may be a separate hardware component.

Preferably, the duty cycle of the square wave is such that the modules will always be able to discern the edges of the timing signal despite differences in their PWM counters which are introduced in the manufacturing process. As discussed above, the "on-time" of the PWM module needs to be at least long enough to outlast the data part of the combined signal. This can be achieved by suitable setting of the duty cycle, but it is also dependent on the frequency (i.e. period) of the PWM signal. Typically, the PWM module counts up from 0 to a given value which defines its period (and hence its frequency) before resetting and starting over (unless of course a reset is received earlier at the reset input). This period is divided into an "on" time and an "off" time according to the duty cycle input. The PWM module counts according to a clock input, (e.g. the local microprocessor clock). However, there is no guarantee that the clock used to drive the PWM module (which in turn generates the local synchronised clock signal that is synchronised with the master controller) has exactly the right frequency. Manufacturing tolerances result in variations which can vary the clock speed by a few percent. Therefore the frequency input to the PWM module on each of the plurality of modules cannot be guaranteed to be the same as is used for the master timing signal generation. Instead, it is desirable to ensure that the local PWM module will not operate faster—for proper synchronisation it is necessary that the local PWM module resets via its reset input, as triggered by the timing signal rather than by its own normal end-of-cycle reset. Thus preferably the frequency of the PWM module is set to be lower than the frequency of the timing signal generated by the master controller. In preferred embodiments the frequency of the PWM module is no more than 10% lower than the frequency of the timing signal generated by the master controller. While in principle any lower frequency would be suitable, in practice there is an advantage to having the local frequency as close to the intended frequency as possible (while ensuring it outlasts the master controller's timing signal, even under manufacturing variations), as the local controllers can then be used without the master controller for brief periods of time without the synchronisation going too wildly wrong. This may for example occur in the event of a missed signal from interference or at start up, before the first timing signal has been received.

As well as generating the local timing signal that matches (i.e. is synchronised with) that of the master controller (or at least a portion of which is synchronised with the master controller e.g. the rising or falling edges of each signal are synchronised), the modules also need to receive (and in some examples demodulate) the data signal that was transmitted along with the timing signal as part of the combined signal.

In examples in which the master controller is arranged to modulate the data signal onto the timing signal to generate the combined signal, optionally the received data is demodulated by one or more of the plurality of modules. To do so, each of the plurality of modules may be arranged to combine the received combined signal from the master controller with an inverted form of the PWM output of the PWM module to generate a local module data signal which is passed to a data signal decoder. The inverted output may be generated from the non-inverted output, e.g. using a standard inverter circuit. In some cases, the PWM module may output an inverted and a non-inverted version of its signal as standard, in which case, the inverted output may be taken directly from the PWM module. In this case, while the main output is ON ('1' or 'high') to override the incoming combined signal as discussed above, the inverted output is the opposite and thus is OFF ('0' or 'low') and thus allows the data part of the signal to be read. In preferred examples the received combined signal from the master controller is combined with the inverted form of the PWM output of the PWM module using a second logical OR operation. As discussed above, a hardware OR gate may be configured to perform the second logical OR operation. Since, during the high in the timing signal, the inverted output which is input to the OR gate is '0', the output is not changed. It is therefore clear that this OR gate is not necessary. However, it is advantageous, particularly if the transmitted signal is received by a UART module, since it is preferable that the signal received by an idle UART module is high. Thus the inverted PWM signal generates a high signal during the "off" phase of the PWM module which prevents erroneous operation of the UART when no data is being transmitted.

The above-described mechanisms for transmitting the timing signal and the data signal allow the important, real-time signals of the system to be transmitted reliably from the master controller to each of the plurality of modules, making efficient use of the available bandwidth, while retaining synchrony even at high frequencies, e.g. at frequencies higher than 100 Hz, more preferably at frequencies higher than 1 kHz, yet more preferably at frequencies higher than 10 kHz. These real-time signals are the ones that must reach the modules without delay in order to allow proper processing and fast response of the circuit. For example the switching signals in an MMC or a DC to DC converter must be highly accurate in real-time in order for the circuit to output the right voltage according to demand. Such information typically comprises the timing signal (to ensure synchrony) and some form of target value in the form of a target duty cycle (e.g. for the switching circuit), target voltage or target current. This target information can be transmitted in the data signal, and is received (and optionally demodulated) by the local module's microprocessor where it can be used to perform appropriate control of the local circuit, e.g. appropriate switching control.

In addition to these real-time signals, other data often needs to be transferred between the master controller and the modules. In particular, other sensor data from the modules should often be fed back from the modules so as to aid in determining operational measures such as state of health or detecting errors. Such sensor data does not normally need to be transferred in real-time, being instead relevant on a slower time scale. Thus, attempting to transmit such data by the same mechanism as the timing signal and data signal as described above can be inefficient. Therefore, in order to allow additional slower time (or "soft time") signals to be sent independently of the important real-time signals, the power electronics circuit preferably further comprises a bidirectional data transfer network comprising a transceiver in the master controller and a transceiver in at least one of the plurality of modules, optionally in each of the plurality of modules, the bidirectional data transfer network being arranged to transfer additional data between the master controller and the at least one of, or optionally each of, the plurality of modules.

The bidirectional data transfer network may operate on completely separate principles and on a slower or less immediate transfer principle as the sensor data is generally not as time sensitive as the timing signal and the information that is transmitted therewith. In some preferred embodiments the bidirectional data transfer network is asynchronous. To provide one non-limiting example, the bidirectional data transfer network may be a CAN bus (Controller Area Network). The bidirectional data transfer network may be arranged to transfer at least one of voltage measurements, current measurements and temperature measurements from each of the plurality of modules to the master controller.

According to another aspect, the invention provides a method of transmitting a timing signal and a data signal from a master controller to a plurality of modules in an electronics circuit, the method comprising:
the master controller generating a timing signal;
the master controller generating a data signal;
the master controller generating a combined signal based on both the timing signal and the data signal; and
the master controller broadcasting the combined signal to each of the plurality of modules.

According to another aspect, the invention provides a method of transmitting a timing signal and a data signal from a master controller to each of a plurality of modules in an electronics circuit, the method comprising:
the master controller generating a timing signal;
the master controller generating a data signal;
the master controller modulating the data signal onto the timing signal to generate a combined signal; and
the master controller broadcasting the combined signal to each of the plurality of modules.

It will be appreciated that all of the preferred or optional features described above in relation to the apparatus can be applied equally to this method. More generally, features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which:

FIG. 3a shows schematically a more detailed view of a device according to the present invention, as shown in FIG. 2a.

FIG. 1 shows a modular multilevel converter (MMC) 2 as is known in the art. Modular multilevel converters offer a wide range of benefits including: distributed power losses, very low losses during switching, low switch block voltages—at the expense of complexity. MMCs may comprise a number of "converter legs" (three shown in FIG. 1), each of which contains two "converter arms". Each "arm" comprises a large number of low voltage MMC modules 4 connected in series with an inductor. The MMC 2 uses different switching times of the various switching networks to achieve a desired voltage ($V_A$, $V_B$, $V_C$). A large number of MMC modules 4 is present as indicated by the ellipsis dots in the Figure. The dashed lines, connecting each of the MMC modules 4 to the master microcontroller 6, indicate the large number of physically separated signal paths that are required to control all of the switches of this MMC 2 in synchrony.

Each module 4 includes two solid-state switches ($Q_H$ and $Q_L$), in this case MOSFETs, and a capacitor (or battery). In the half-bridge example of FIG. 1, each module 4 of the converter requires two input signals in order to operate the MOSFETs. With a larger number of modules 4, it becomes impractical to drive every gating signal through each of these modules 4 using a single microcontroller 6, and therefore in larger implementations it is preferable for there to be some sort of multiplexing (generally time-based multiplexing). The gating signals to each module 4 must be galvanically isolated from the Master Controller 6 and cannot be driven directly by a pin of a microcontroller.

It is important for the proper function of the MMC 2 that the switching actions of all of the MOSFETs are synchronised in order to achieve proper voltage and current regulation at the dc terminals ($V_{DC+}$ and $V_{DC-}$) of the converter 2 and the ac terminals ($V_A$, $V_B$, $V_C$) of the converter 2. In addition to these synchronised gating signals, signals are also transmitted from each module 4, to the master controller 6 from sensors within the modules 4. Each module 4 has its own voltage sensor, and possibly other sensors in addition to this, such as current and temperature sensors. In the MMC 2 of FIG. 1, all of the signals described here are routed to and from the master controller 6. On average an MMC converter 2 would switch at 50-60 Hz, which is a slow speed which can reasonably be achieved with the use of a single master controller 6. However, in certain cases it is desirable to be able to achieve switching of up to 20 kHz, for example in large power converters in which multiple microcontrollers or pulse width modulation (PWM) modules must work together. In this case synchronisation is highly important.

One aim of preferred embodiments of the present invention is therefore to address the particular problem of synchronising and controlling the switching action of many low voltage power electronic switching networks connected in series, in particular in the control of distributed DC to DC converters.

Figure 2A:
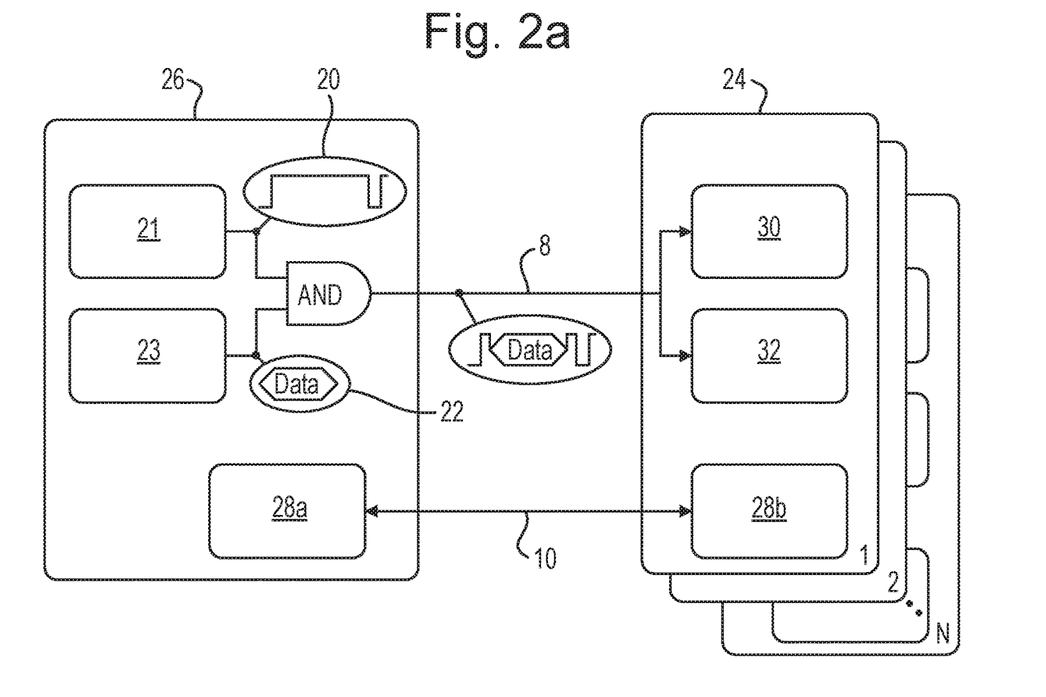
FIG. 2a shows schematically a device according to the present invention.

FIG. 2a shows schematically a device according to the present invention, arranged to synchronise a signal sent by master controller 26 to a number N of modules 24. The signals of the master controller 26 are separated into "real-time" signals 8 and "soft-time" signals 10. Real-time signals 8 are those that must be transmitted at an exact moment in time in order for the device to function properly, for example the gating signals of the MOSFETs of FIG. 1 are real-time signals and require micro- or nano-second precision. Soft-time signals are signals that do not need to be transmitted at an exact time, for example temperature sensor signals are soft-time signals, and in some examples so are voltage and current sensor signals.

The soft-time signals 10 are communicated over a standard communication bus. The soft-time signals 10 are transmitted from the master controller 26 to the module 24 using any suitable transmitter/receiver 28a and are received by the module 24 by any suitable transmitter/receiver 28b. Preferably the soft-time signals 10 are bi-directional so that data can be sent to and received by every module 24 and the master controller 26. In some examples the soft-time signals 10 could be transmitted using the same communication channel as the real-time signals 8. However in other embodiments the transmission of the real-time signals 8, in particular the data together with the timing signals (discussed below) requires most of the bandwidth of the wire, and hence the use of a separate communication channel. One particular, non-limiting example of a suitable network for transmitting the soft-time signals is a CAN bus. Advantages of a CAN bus are high robustness combined with the capability to interconnect a large number of sub-systems for data exchange while saving on physical hard-wired interconnections.

In order to transmit real-time data signals, a digital serial signal 22 (generated by a digital serial signal generator 23), which comprises real-time data packets, is combined with a timing signal 20 (generated by a timing signal generator 21), using an AND gate (or any implementation, e.g. combinations of logic gates, the output of which is exactly equivalent to that provided by an AND gate) i.e. the digital serial signal is modulated onto the timing signal. This combined real-time data 8 is transmitted to the module 24, where the module separates the data using a timing decoder 30 and a digital signal decoder 32. The digital serial signal 22 is used to transmit real-time data packets to all of the modules, at the same time, at regular time intervals as defined by the timing signal generator 21. These real-time data packets can for example provide duty cycle information to a module 24. The data packets can be sent at any time during the period for which the timing signal 20 is high. The timing signal 20 is used to synchronise the clocks and/or switching actions on the modules 24. The timing signal 20 is not used to help synchronise the digital signal generator 23 with the digital signal decoder 32.

Figure 2B:
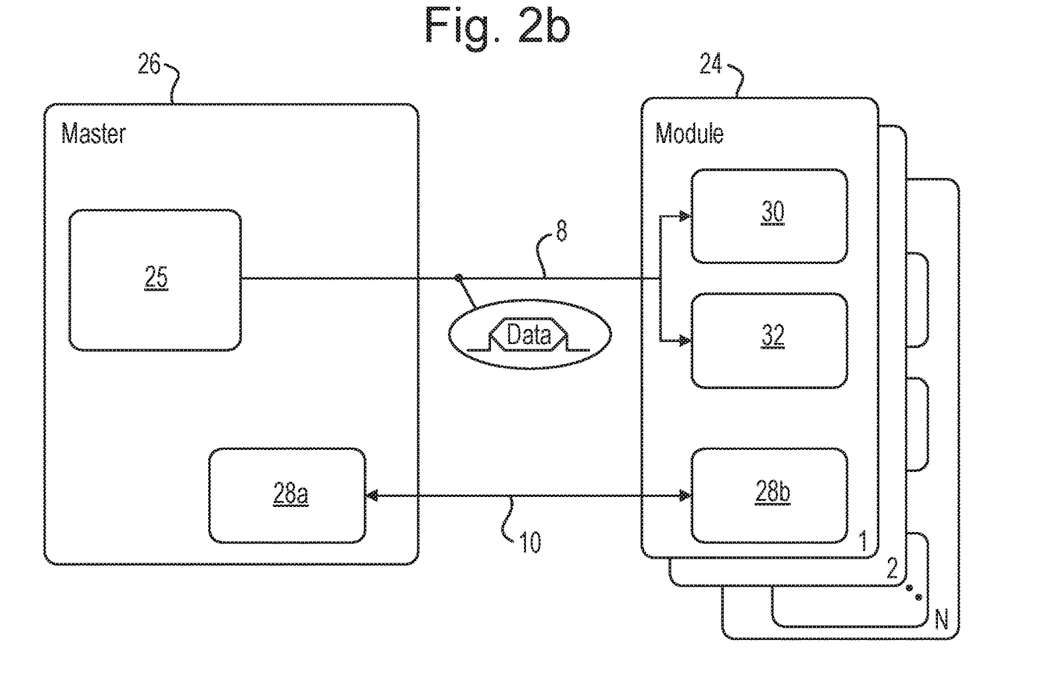
FIG. 2b shows schematically an alternative device according to the present invention.

FIG. 2b shows an alternative to the device of FIG. 2a. The alike components have been labelled with the same reference numerals. In FIG. 2b, instead of including the separate timing signal generator 21 and digital serial signal generator 23 of FIG. 2a, the device includes a precision-timed data transmission device 25. In this example synchronisation is achieved by generating digital serial signals at precisely timed intervals, using a digital serial signal generator with precision timing (precision-timed data transmission device 25), e.g. a "precision-timed UART module". Such a component could for example be implemented in a field-programmable gate array (FPGA), which is an integrated circuit designed to be configured by a customer or a designer after manufacturing. In this example the digital signal generator outputs data at accurate time intervals and these time intervals can then be extracted from the received signal and used, as an alternative to the timing signal 20 of the timing signal generator 21.

Figure 3A:
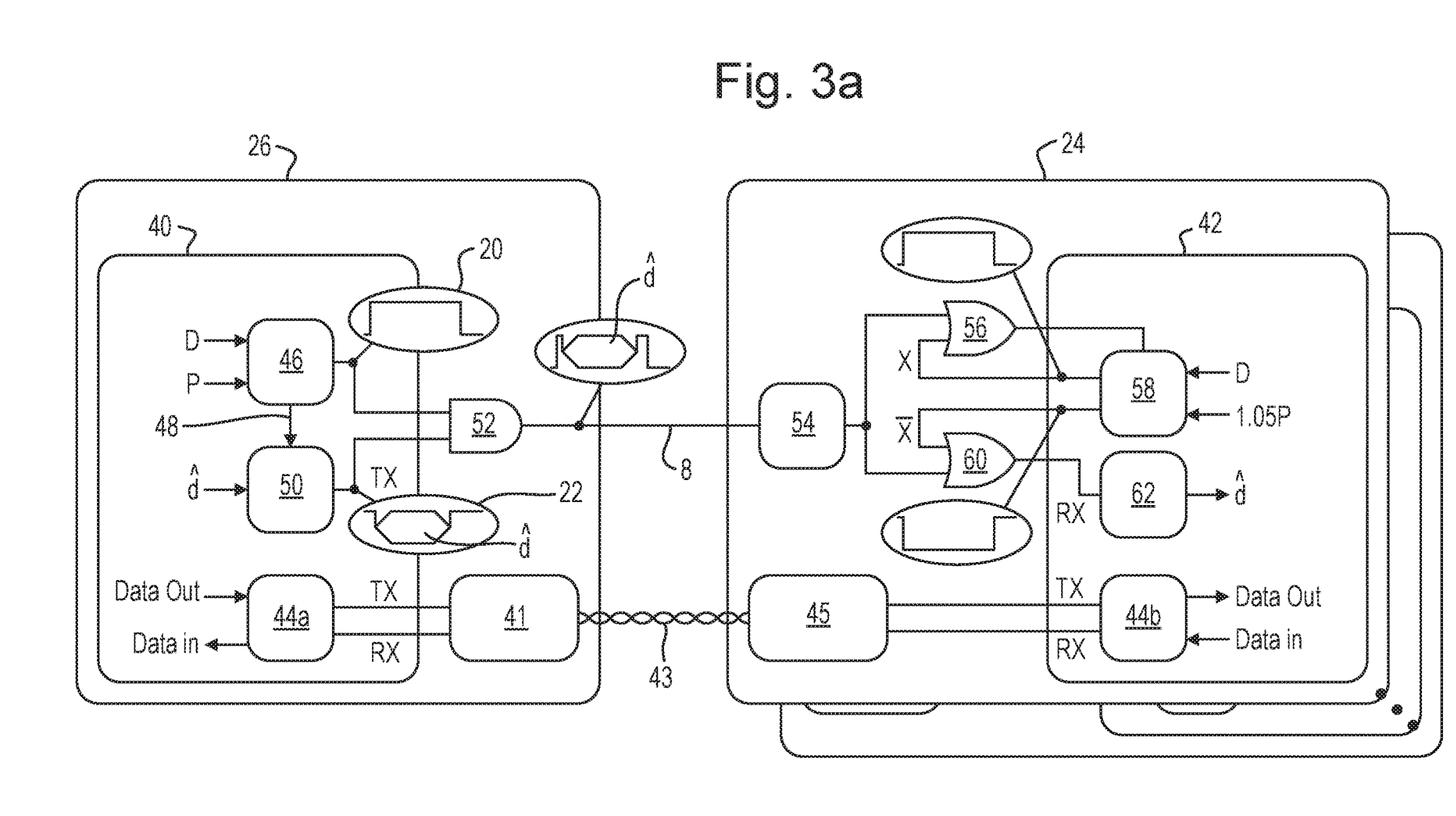

FIG. 3a shows schematically an example of a possible implementation of the device represented in FIG. 2a. In this example the invention is implemented with off the shelf components and signals are encoded and decoded with hardware, freeing up the computational time of the master microcontroller 40 and the module microcontroller 42.

The soft-time signals 10 are input and output to a first CAN module 44a, in the master micro-controller 40, and are input and output to a second CAN module 44b, in the module microcontroller 42, as represented by the respective arrows shown with each CAN module. The first CAN module 44a transmits the data to a CAN Transceiver 41, which then transmits the data via a CAN bus 43 to an Isolated CAN Transceiver 45, which is within the module 24.

In order to transmit the real-time signals, a pulse width modulation module (PWM module) 46 is supplied with a particular master period, which is a unitless count value here referred to as P, and a particular "on" time D (i.e. duty cycle). This "on-time" D is a number between 0 and 1 representing the fraction of the period P that is to be "on". This PWM module counts from 0 to P (the rate of counting being dependent on the local clock of the master microcontroller 40). At count 0 the timing signal produced by the PWM module 46 goes high. The PWM module counts from 0 to P, and when it reaches a particular value (the product of P and D), the signal drops from high to low. The counter then resets when it reaches the total count value, P. The duty cycle D, defining the length of the high part of the timing signal, is preferably defined to be sufficiently long so that all of the desired data can fit into the high part of the signal.

Preferably the data output is synchronised with the timing signal produced by the PWM module 46. This can optionally be achieved by the PWM module 46 transmitting a trigger signal 48 to a universal asynchronous receiver transmitter (UART) module 50 upon the timing signal "going high", for example when the PWM counts 0. This allows the UART module 50 to begin transmitting the data d which has been generated by the master microcontroller 40, as the timing signal goes high, therefore maximising the possible length of time for data transmission. A small delay may be introduced to provide clear separation of the data signal from the rising edge of the PWM timing signal.

The timing signal 20 produced by the PWM module is combined with the data signal 22 transmitted by the UART module 50 using an AND gate 52, or an arrangement equivalent to an AND gate. This real-time signal 8 is then transmitted (i.e. broadcast) to a digital isolator 54 within each module 24.

The purpose of a digital isolator 54 is to allow communication between two different systems that have different ground potentials. The digital isolator 54 is required because each module 24 is "stacked" on top of another, and the ground signal of each module is referenced to the positive signal of the module "beneath" it in the stack, rather than each being referenced to a common ground. As a result, a digital isolator 54 is used.

A first OR gate 56, or equivalent arrangement, is arranged to have the output of the digital isolator 54 as a first input and to have the output of a first module PWM 58 as a second input. The first module PWM 58 is provided, by the module microcontroller 42, with a duty cycle of D, the same as the duty cycle D of the PWM module 46 of the master controller 26. The time period of the first module PWM 58 is 1.05P i.e. it is set to be 1.05 times the period provided to the master PWM 46 of the master controller 26.

In this embodiment the first module PWM 58 is reset by a rising edge at its reset input. The rising edge of the input signal from the digital isolator 54 thus causes the first module PWM 58 to reset the counter of the first module PWM 58. After receiving this rising edge and re-setting the first module PWM 58, the first module PWM 58 then outputs a high signal X to the OR gate 56, with the same duty cycle D as the PWM module 46 of the master controller 26. The duty cycle D is pre-set and does not depend on the input signal received by the first module PWM 58. The period of this first module PWM 58 is set to be 1.05 times longer than that of the master controller PWM 46 so that the first module PWM 58 does not reset to a high signal as a result of reaching the maximum time period earlier than the master PWM 46, as a result of having a faster local clock (typically provided by the module microcontroller 42), but only as a result of receiving a rising edge signal from the digital isolator 54. This could of course be achieved using a period much greater than 1.05P, or even a period to P=∞. However, in most power electronic applications a period of P=∞ would be undesirable as, in the absence of an external reset, no switching would ever occur and it could have catastrophic consequences. In one embodiment of the invention, modules 24 are used to power up the master 26, and setting this time period to infinity causes undesirable issues with this process. The first module PWM 58 outputting this high signal as an input to the OR gate 56 ensures that PWM 58 is not reset due to rising edges created by the data signal received from the digital isolator 54. Thus the PWM 58 is triggered by the rising edge of the timing signal and then overrides the data signal for a period defined by the duty cycle, D (and equal to the product of P and D), which is selected to be long enough to outlast the data transmission.

The first module PWM 58 also outputs a signal $\bar{X}$ which is the complement of the signal X, meaning that where the timing signal is high the complement signal is low, and vice versa. The signal $\bar{X}$ is provided as a first input to a second OR gate 60, or equivalent. The second input of the second OR gate 60 is the signal received from the digital isolator 54. The output of the second OR gate 60 is such that during the "high" period of the original timing signal, the complement signal $\bar{X}$ will be low, and therefore the output of the second OR gate 60 is such that everything within the "high" period is preserved in the output, so that the output of the second OR gate 60 is a reconstruction of the digital serial signal 22 generated by the digital serial signal generator 23. The output signal of the second OR gate 60 is fed into the receiving port of a UART module 62, which recovers the data signal a which was input to the master UART 50.

Considering the example of a power converter, this data can then be used by each module 24 to, for example, set a duty cycle (or on-time) for another pulse width modulator (on each module), for example a pulse width modulator involved in the switching process for a particular module 24. All modules 24 receive the same duty cycle information, set by the master 26 in order to provide a desired output voltage. The module microcontroller 42 could optionally implement this information straightforwardly. Alternatively, the module microcontroller 42 of each module 24 could then individually adjust the duty cycle chosen by the master 26 based on each of their own internal states, to provide the desired voltage more accurately.

Figure 3B:
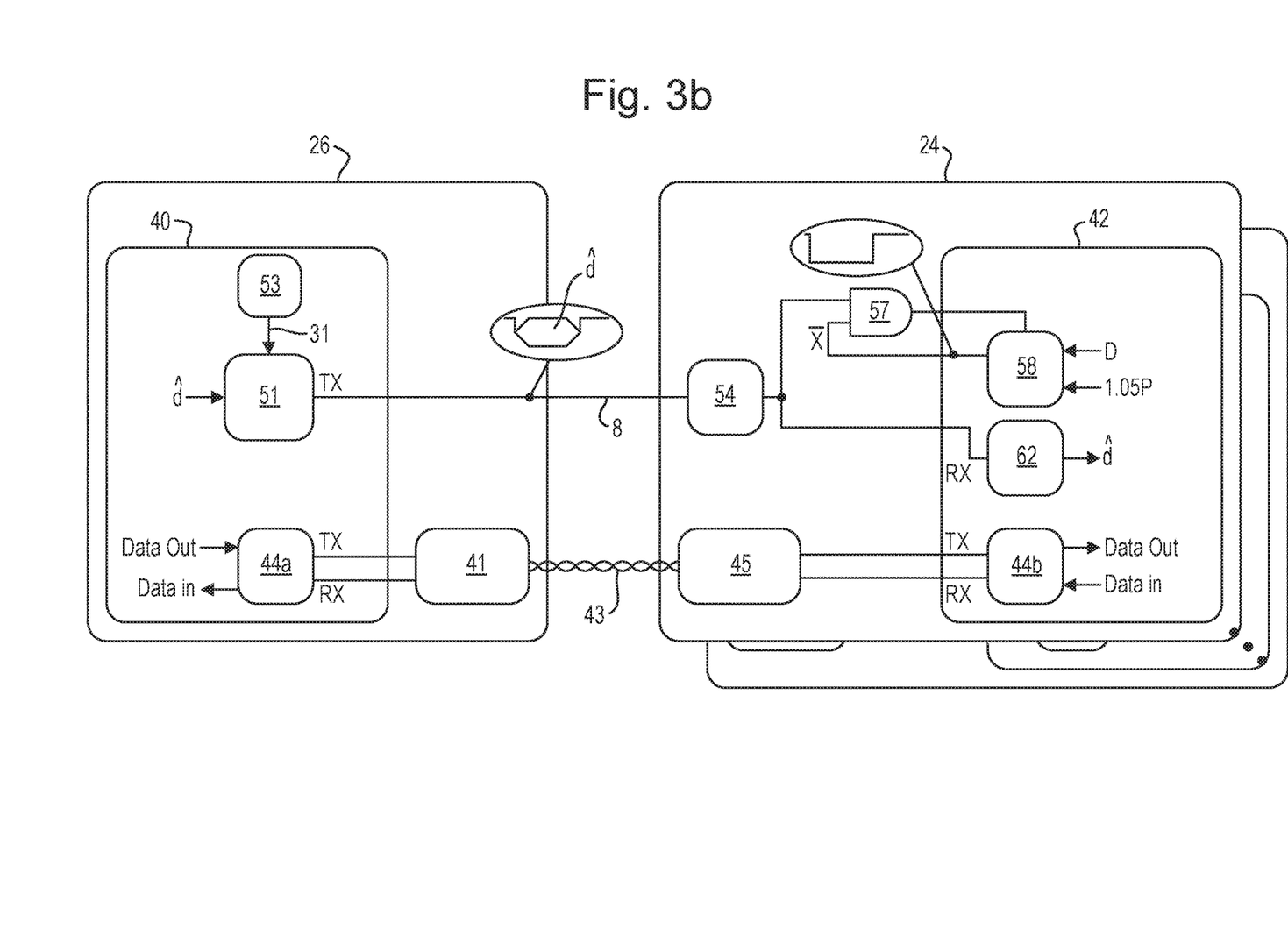
FIG. 3b shows schematically a more detailed view of a device according to the present invention, as shown in FIG. 2b.

FIG. 3b shows schematically an example of a possible implementation of the device represented in FIG. 2b. Like components of FIG. 3b have been labelled using the same reference numerals as FIG. 3a, however in this example a precision-timed UART module 51 is used instead of the PWM module 46 and the UART module 50 of FIG. 3a. Although UART module 51 is here referred to as a "precision-timed" UART module, it could in fact be the same as a standard UART module (i.e. UART module 50), but could be supplied with a highly accurate trigger signal 31, indicating a precise time at which to begin data transmission. The modules 24 can then use the beginning, end, or any other suitable point, in a data transmission signal to reset their timers and thus achieve synchronisation. In this example, the timing signal is thus a data trigger signal 31, provided by a trigger timing signal generator 53, to UART module 51, which triggers the UART module 51 to output certain data at precisely timed time intervals. The precision with which this data is transmitted allows each of the modules 24 to derive a timing signal from the received signal, which can then be used for synchronisation. Since the precision-timed UART module 51 is used, the received signal can be fed directly into UART module 62, in order to recover the data signal a, without first being input into an OR gate.

In this example, the idle output of the UART module 51 is "1" or 'high', thus when no data is being transmitted the AND gate 57 receives a high signal from the UART 51. The device is arranged so that the other input to the AND gate 57 is the complement $\overline{X}$ of the signal which is output by the PWM. As described below, the PWM module 58 is arranged to output a 'high' signal within the period in which data is transmitted, and a 'low' signal otherwise, so that the signal $\overline{X}$ received by the AND gate 57 is 'low' in the data transmission period and 'high' otherwise, as shown. The PWM module 58 is arranged to reset on a falling edge of the input signal. In order to signal the start of a data transmission, a "low" signal (possibly as part of a longer pattern) is added to the beginning of the transmitted signal, ahead of the data packet. The "high" to "low" transition transmitted by the UART module 51 causes the AND gate 57 to transition to a "low" signal and this creates a falling edge to the reset input of the first module PWM 58. This falling edge signals the PWM module 58 of each module to reset its counter and allows the PWM 58 to recognise that data transmission has started.

Then, as described above, the PWM module 58 counts up to a preset value, and whilst it is counting up to this value, outputs a 'low' signal $\overline{X}$, which is fed back into the AND gate 57. This "low" signal means that, regardless of the signal supplied to the AND gate by the data packet, the AND gate 57 will keep outputting a "low" signal, and thus will not reset the PWM 58. Once the preset count value P*D is reached, the PWM output signal $\overline{X}$ goes back to 'high', but by this time data transmission will have ended and the combined signal will have reverted to "high", so no reset occurs until the next falling edge is received on the combined signal from digital isolator 54 (or until the total period of the PWM 58 is reached, but, as described above, the PWM 58 is arranged so that this should never be reached before a new falling edge is received at the reset input).

Figure 4A:
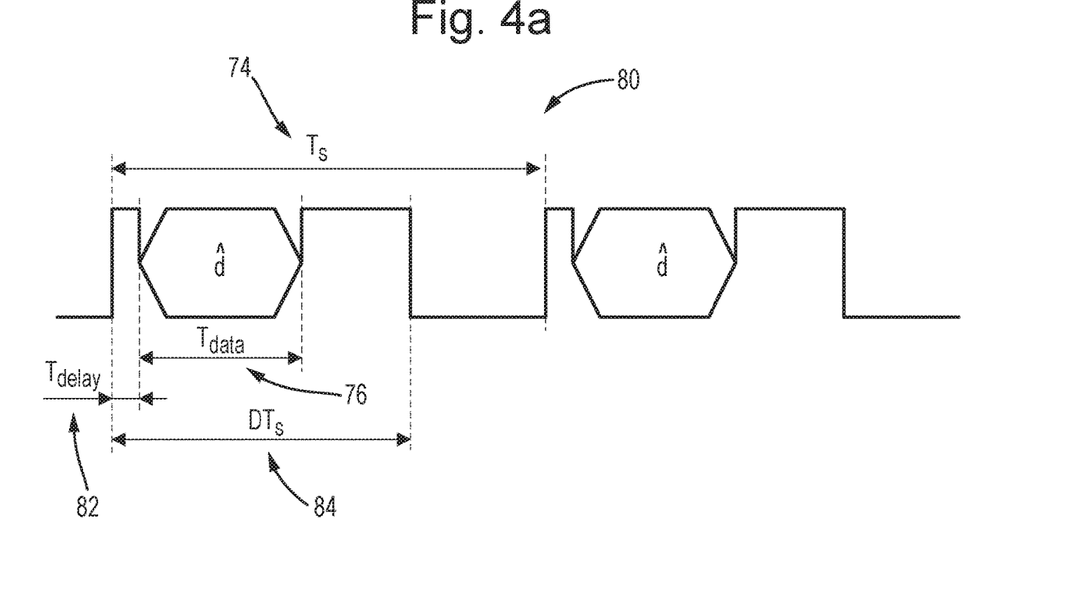
FIG. 4a shows a combined output signal in accordance with the present invention.

FIG. 4a shows a possible combined signal 80 as output by the AND gate of FIGS. 2a and 3a, in which a data signal is modulated onto a timing signal. As explained above, the master controller 26 is preferably arranged to modulate the data signal onto the phase of the timing signal, with a minimum delay, $T_{delay}$. $T_{delay}$ is shown in FIG. 4a by the reference numeral 82. The separation between data packets $T_S$, is shown with reference numeral 74, and the length of the data packet $T_{data}$, by reference numeral 76. In this case, unlike in the case of the precision-timed UART module 51, the length of the data signal 76 can be different to the length of the timing signal $DT_S$, which is shown with reference numeral 84 and the data packet $T_{data}$ can be transmitted an any time doing $DT_S$.

Figure 4B:
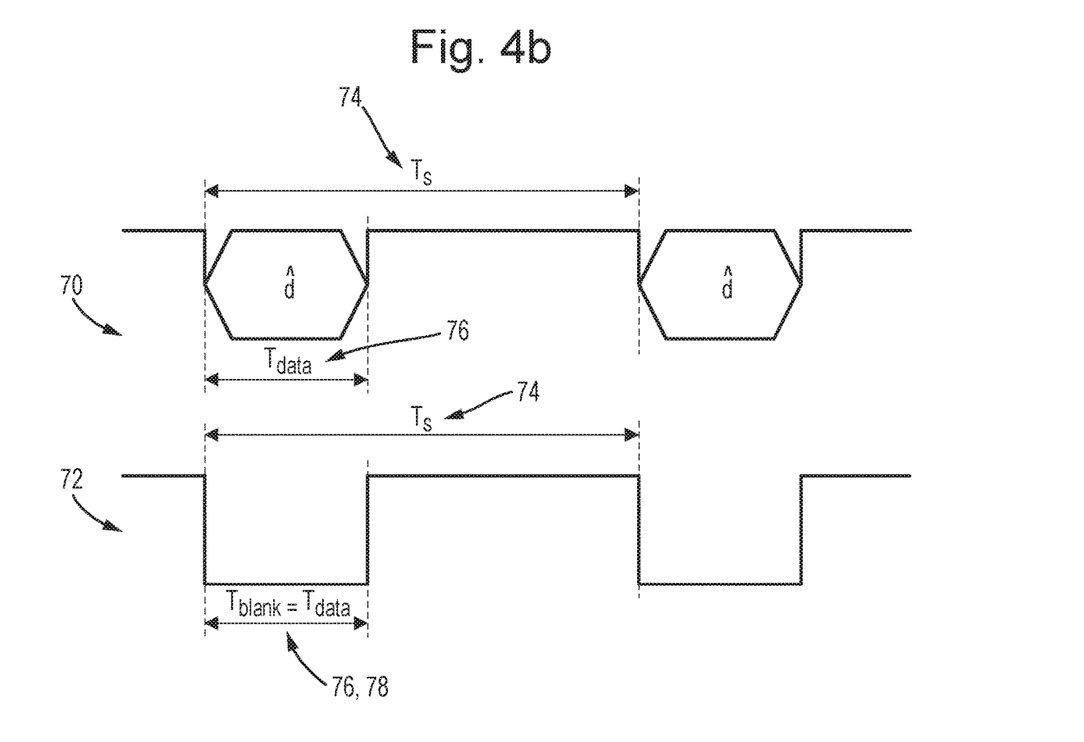
FIG. 4b shows an alternative combined output signal in accordance with the present invention and a PWM output signal.

FIG. 4b shows a representation of the combined timing and data signal 70, which is the output of the transmission device 25 or UART module 51 shown in FIGS. 2b and 3b, and a representation of the timing signal, $\overline{X}$, 72, which is output by the PWM module 58 of the device shown in FIGS. 2b and 3b. The precision-timed UART module 51, outputs a signal in which the separation between data packets is $T_S$, labelled 74, and the length of the data packet is $T_{data}$, 76. The timing signal 72 output by the PWM module is arranged to have the same period, $T_S$, 74, as the combined signal 70, and the duty cycle D of the PWM 58 is configured so that the "off-time" of the PWM output signal, $\overline{X}$, 78 is at least the same as the length of the data packet $T_{data}$, 76. In the example shown, the "off-time" is the same length as the length of the data packet $T_{data}$ 76, however the "off-time" may be longer than this, for example, the "off-time" may be 1.05 times longer than the length of the data packet $T_{data}$, in order to make the process more robust.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An electronics circuit, comprising:
   a master controller; and
   a plurality of modules, each comprising a local clock;
   wherein the master controller comprises:
     a timing signal generator arranged to generate a timing signal; and
     a data signal generator arranged to generate a data signal, wherein data in the data signal is independent from data in the timing signal;
   wherein the master controller is arranged to generate a combined signal based on both the timing signal and the data signal;
   wherein the master controller is arranged to broadcast the combined signal to the plurality of modules; and
   each of the plurality of modules is arranged to reset the local clock of the module based on the received combined signal, so as to synchronise the local clocks of the plurality of modules.

2. An electronics circuit as claimed in claim 1, wherein each of the plurality of modules is arranged to extract the data signal from the combined signal.

3. An electronics circuit as claimed in claim 1, wherein the data signal is a serial digital data signal.

4. An electronics circuit as claimed in claim 1, wherein the timing signal is a precisely-timed trigger signal, wherein the timing signal generator is configured to send the precisely-timed trigger signal to the data signal generator, and wherein the data signal generator is arranged to transmit data at a precise time, based on the precisely-timed trigger signal.

5. An electronics circuit as claimed in claim 1, wherein the master controller is arranged to modulate the data signal onto the timing signal to generate the combined signal.

6. An electronics circuit as claimed in claim 5, wherein the timing signal is a square wave.

7. An electronics circuit as claimed in claim 6, wherein master controller is arranged to modulate the data signal onto one phase of the timing signal.

8. An electronics circuit as claimed in claim 7, wherein the master controller is arranged to modulate the data signal onto the phase of the timing signal, with a delay following the start of the phase.

9. An electronics circuit as claimed in claim 6, wherein the master controller is arranged to modulate the data signal onto the timing signal by performing a logical AND operation on the data signal and the timing signal.

10. An electronics circuit as claimed in claim 9, wherein a hardware AND gate is configured to perform the logical AND operation.

11. An electronics circuit as claimed in claim 1,
   wherein each of the plurality of modules comprises a PWM module arranged to generate a PWM output having a frequency and a duty cycle, and arranged to reset its PWM output based on a reset signal, wherein the received combined signal from the master controller is combined with the PWM output of the PWM module to generate the reset signal.

12. An electronics circuit as claimed in claim 11, wherein the received combined signal from the master controller is combined with the PWM output of the PWM module using a first logical OR operation.

13. An electronics circuit as claimed in claim 12, wherein a hardware OR gate is configured to perform the first logical OR operation.

14. An electronics circuit as claimed in claim 11, wherein the received combined signal from the master controller is combined with the PWM output of the PWM module using a logical AND operation.

15. An electronics circuit as claimed in claim 14, wherein a hardware AND gate is configured to perform the logical AND operation.

16. An electronics circuit as claimed in claim 11, wherein the frequency of the PWM module is set to be lower than the frequency of the timing signal generated by the master controller.

17. An electronics circuit as claimed in claim 16, wherein the frequency of the PWM module is no more than 10% lower than the frequency of the timing signal generated by the master controller.

18. An electronics circuit as claimed in claim 11, wherein each of the plurality of modules is arranged to combine the received combined signal from the master controller with an inverted form of the PWM output of the PWM module to generate a local module data signal which is passed to a data signal decoder.

19. An electronics circuit as claimed in claim 18, wherein the received combined signal from the master controller is combined with the inverted form of the PWM output of the PWM module using a second logical OR operation.

20. An electronics circuit as claimed in claim 19, wherein a hardware OR gate is configured to perform the second logical OR operation.

21. An electronics circuit as claimed in claim 1, further comprising a bidirectional data transfer network comprising a transceiver in the master controller and a transceiver in each of the plurality of modules, the bidirectional data transfer network being arranged to transfer additional data between the master controller and each of the plurality of modules.

22. An electronics circuit as claimed in claim 21, wherein the bidirectional data transfer network is asynchronous.

23. An electronics circuit as claimed in claim 21, wherein the bidirectional data transfer network is arranged to transfer at least one of voltage measurements, current measurements and temperature measurements from each of the plurality of modules to the master controller.

24. A method of transmitting a timing signal and a data signal from a master controller to a plurality of modules in an electronics circuit, the method comprising:
  the master controller generating a timing signal;
  the master controller generating a data signal, wherein data in the data signal is independent from data in the timing signal;
  the master controller generating a combined signal based on both the timing signal and the data signal;
  the master controller broadcasting the combined signal to each of the plurality of modules; and
  each of the plurality of modules resetting a local clock of the module based on the received combined signal, so as to synchronise the local clocks of the plurality of modules.

25. A method as claimed in claim 24, wherein the master controller generating a combined signal comprises;
  the master controller modulating the data signal onto the timing signal to generate a combined signal.

26. An electronics circuit, comprising:
  a master controller; and
  a plurality of modules;
  wherein the master controller comprises:
    a timing signal generator arranged to generate a timing signal; and
    a data signal generator arranged to generate a data signal;
  wherein the master controller is arranged to generate a combined signal based on both the timing signal and the data signal; and
  wherein the master controller is arranged to broadcast the combined signal to the plurality of modules;
  wherein each of the plurality of modules is arranged to reset a local clock of the module based on the received combined signal; and
  wherein each of the plurality of modules comprises a PWM module arranged to generate a PWM output having a frequency and a duty cycle, and arranged to reset its PWM output based on a reset signal, wherein the received combined signal from the master controller is combined with the PWM output of the PWM module to generate the reset signal.

\* \* \* \* \*